(12) United States Patent
Kim (10) Patent No.: US 11,875,699 B2
(45) Date of Patent: Jan. 16, 2024

(54) METHODS FOR ONLINE LANGUAGE LEARNING USING ARTIFICIAL INTELLIGENCE AND AVATAR TECHNOLOGIES

(71) Applicant: Columbia College, Vienna, VA (US)

(72) Inventor: Kwangsoo Kim, Vienna, VA (US)

( * ) Notice: Subject to any disclaimer, the term of this patent is extended or adjusted under 35 U.S.C. 154(b) by 0 days.

(21) Appl. No.: 18/297,401

(22) Filed: Apr. 7, 2023

(65) Prior Publication Data

US 2023/0343239 A1    Oct. 26, 2023

Related U.S. Application Data

(60) Provisional application No. 63/372,979, filed on Apr. 21, 2022.

(51) Int. Cl.
    *G09B 19/06*    (2006.01)
    *G10L 13/02*    (2013.01)

(52) U.S. Cl.
    CPC .............. *G09B 19/06* (2013.01); *G10L 13/02* (2013.01)

(58) Field of Classification Search
    CPC ................................ G10L 13/02; G09B 19/06
    USPC .......................................................... 434/156
    See application file for complete search history.

(56) References Cited

U.S. PATENT DOCUMENTS

| | | | |
|---|---|---|---|
| 11,074,829 B2 | 7/2021 | Zhang et al. | |
| 11,507,756 B2* | 11/2022 | Lima ....................... | H04L 51/02 |
| 2021/0193135 A1* | 6/2021 | Gavai ..................... | G10L 15/22 |
| 2022/0076588 A1* | 3/2022 | Kwon ..................... | G09B 7/02 |
| 2022/0108681 A1* | 4/2022 | Chang ..................... | G06N 3/08 |
| 2023/0351121 A1* | 11/2023 | Hasan ................... | G06F 16/322 |

FOREIGN PATENT DOCUMENTS

| | | |
|---|---|---|
| JP | 2017201342 A | 11/2017 |
| KR | 20010098274 A | 11/2001 |
| KR | 20200030181 A | 3/2020 |
| KR | 102302137 B1 | 9/2021 |

(Continued)

OTHER PUBLICATIONS

Wikipedia, "Attention (machine learning)", the free encyclopedia, p. 1 (Mar. 5, 2021) (downloaded Jun. 23, 2023) (Year: 2021).*

(Continued)

*Primary Examiner* — Jay Trent Liddle
*Assistant Examiner* — Alyssa N Brandley
(74) *Attorney, Agent, or Firm* — Stonebridge IP, PLLC (57) ABSTRACT

In embodiments, a computer implemented method for language learning includes delivering a user or student's speech into a computer using speech recognition software and sending the output of the speech recognition software to a language adaptive encoding module which outputs a positional encoding matrix; inputting the positional encoding matrix to a trained attention neural network module comprising an encoder and decoder block and a feed forward neural network layer, wherein the trained attention neural network module is trained using course materials for language learning, receiving the output of the trained attention neural network module into a speech synthesis module, delivering the output of the speech synthesis module to an avatar on the computer; and delivering speech from the avatar to the student.

10 Claims, 5 Drawing Sheets

(56) References Cited

FOREIGN PATENT DOCUMENTS

KR 102418558 B1 7/2022

OTHER PUBLICATIONS

M. Deshpande, "The Transformer: A Quick Run Through", Towards Data Science, pp. 1-10 (May 2, 2020) (downloaded Jun. 23, 2023) (Year: 2020).*
Wikipedia, "Attention (machine learning)", the free encyclopedia, downloaded Mar. 8, 2023.
Wikipedia, "Avatar (computing)", the free encyclopedia, downloaded Mar. 8, 2023.
Wikipedia, "Speech recognition", the free encyclopedia, downloaded Mar. 8, 2023.
Wikipedia, "Speech synthesis", the free encyclopedia, downloaded Mar. 8, 2023.
Wikipedia, "Transformer (machine learning model)", the free encyclopedia, downloaded Mar. 8, 2023.

* cited by examiner

METHODS FOR ONLINE LANGUAGE LEARNING USING ARTIFICIAL INTELLIGENCE AND AVATAR TECHNOLOGIES

CROSS REFERENCE TO RELATED APPLICATIONS

This application claims priority to provisional application U.S. 63/372,979 filed on Apr. 21, 2022, which is herein incorporated by reference in its entirety.

BACKGROUND

Description of the Related Art

This invention relates to online language learning such as Vocational English as a Second Language (VESL) programs, or English as a second language (ESL), to help non-native speakers learn native language skills. VESL programs require in-person conversations and practice to develop various pronunciations for different business situations.

To convert a vocational English as a second (VESL) program to a full online course, there are a number of difficulties that need to be resolved including: (1) providing in-person conversation courses; and (2) providing courses including in-person practice with various pronunciations on an online platform. In-person conversation courses provide multiple dialog sections to evaluate the performance of students' speaking and pronunciation to monitor advancement and learning. By using AI and avatar technologies, this invention resolves the difficulties of learning without human interaction to provide a full online application and automation.

SUMMARY DISCLOSURE OF THE INVENTION

To meet requirements for online VESL, this invention relies on Artificial Intelligent (AI) and avatar technologies. AI-based online VESL provides students with a low-pressure platform to alleviate public speaking anxiety by conversing with AI avatars. With these technologies, this invention provides methods to convert existing VESL or English as a Second Language (ESL) programs to AI-based online VESL programs.

In embodiments, a computer implemented method for language learning includes delivering a user or student's speech into a computer using speech recognition software and sending the output of the speech recognition software to a language adaptive encoding module which outputs a positional encoding matrix; inputting the positional encoding matrix to a trained attention neural network module comprising an encoder and decoder block and a feed forward neural network layer, wherein the trained attention neural network module is trained using course materials for language learning, receiving the output of the trained attention neural network module into a speech synthesis module, delivering the output of the speech synthesis module to an avatar on the computer; and delivering speech from the avatar to the student.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DISCLOSURE OF THE INVENTION

The following detailed description is provided to assist the reader in gaining a comprehensive understanding of the methods, products, and/or systems, described herein. However, various changes, modifications, and equivalents of the methods, products, and/or systems described herein will be apparent to an ordinary skilled artisan.

This model is based on Attention Neural networks known as Transformer networks. This invention utilizes Positional Encoding and Score-based Attention Layers. To train non-native speakers, pairs of questions and answers are trained with a score in Transformer.

MODES FOR CARRYING OUT THE INVENTION

Students can join an online VESL program through a browser (client). The server provides the lecture series to the students. The modules are trained with a language model (e.g., Generative Pre-trained Transformer (GPT) 3 or Bidirectional Encoder Representations from Transformers (BERT)) and VESL and ESL materials using deep learning-based natural language processing. The invention can be installed in a learning management system, e.g., an online course offering platform. Students can log in and take courses offered in the system. AI avatars are implanted in a server and are associated with pre-trained modules.

Embodiments of the invention can include the following components: Natural Language Processing (NLP); Deep Learning Technologies (e.g., Long short-term memory, Attention Neural Networks, etc.); and Avatar.

There are two main components to the system Component 1 and Component 2.

Component 1 includes course materials for vocational English as a second language (VESL) or English as a second language (ESL). Exemplary materials can include materials such as Functional English, Pronunciation, English through American Culture, Idioms in American English, Sentence Structure, Speaking, Reading, Listening, Job Success, Academic Writing, Business Writing, and the like. Component 1 course materials are used as an input for Component 2.

Component 2 is a set of AI-based, trained, modules connected to an avatar. Modules include trained modules for dialogue practice, trained modules for placement tests, and trained modules for emotional expressions. The trained modules for dialog are for dialog language learning. The placements tests are used when a student wants to advance to another level. Emotional expression includes various pronunciations with emotional factors for students to adapt their language learning to various environments, especially various business environments. The trained modules output to AI avatars, also known as human-like bots, which are created by AI-based technology. Avatars improve human interaction and are trained to teach the courses to a student using lecture scripts written with the course materials. The component 2 sub-components are utilized according to a students' learning purpose.

VESL courses generally consist of multiple levels such as beginner, intermediate, and advanced. Each level can include lectures, dialogues for practice, and level tests. AI avatars can teach the lectures with pre-defined scripts. The Component 2 modules are trained for interaction with students of each level in a server. Different trained modules in Component 2 are engaged with dialog sections for each level, e.g., beginner, intermediate, and advanced.

Trained modules in Component 2 are then engaged with level placement tests and produce grades. Students typically will need to take a level replacement test whenever they want to upgrade to the next higher level. English levels can be determined by the grade on this test. Component 2 modules are also trained with various emotional factors and pronunciations for students to adapt to various environments. With Component 2 associated lectures and dialogues, students will learn communication skills using different expressions and pronunciations. All the subcomponents return grades which can be used to determine whether the students passed or failed.

Figure 1:
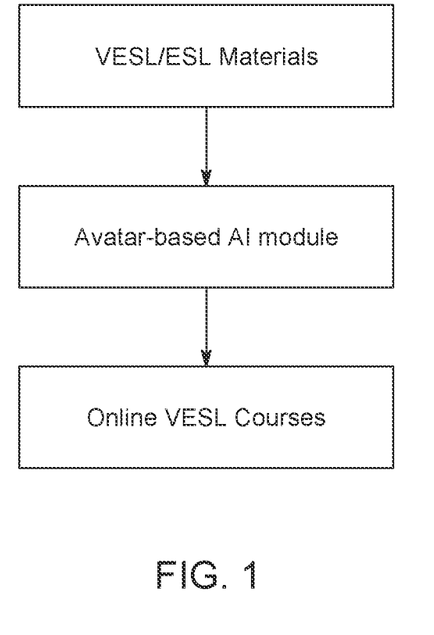
FIG. 1 shows input of vocational English as a second language course materials into an avatar-based artificial intelligence module which provides an online vocational English as a second language course.

FIG. 1 shows component 1 vocational English as a second language course materials as input to a component 2 avatar-based artificial intelligence module.

Figure 2:
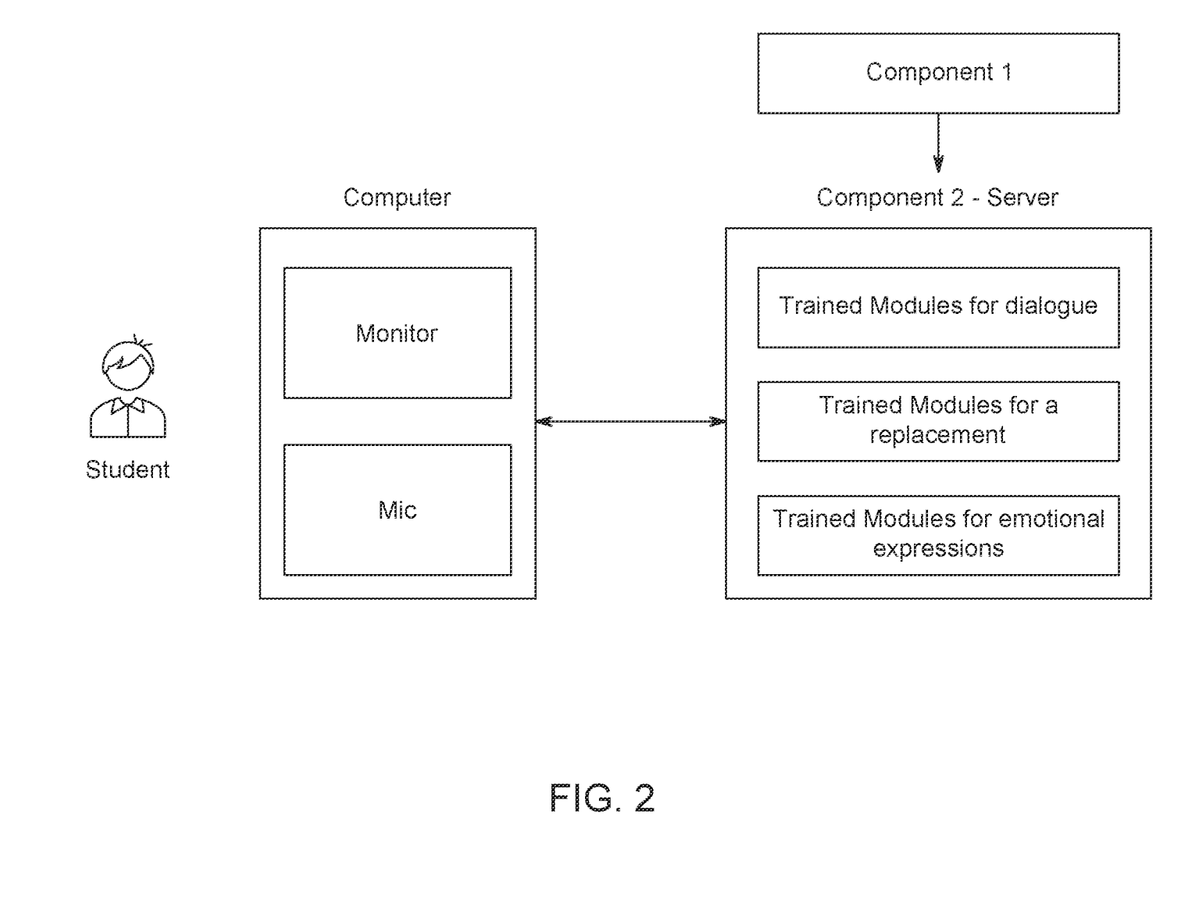
FIG. 2 shows component 1 English as a second language course materials input into component 2 modules, which modules then output back to a computer and student.

FIG. 2 shows component 1 vocational English as a second language course materials as inputs for a component 2 avatar-based artificial intelligence module that includes three subcomponents. A first subcomponent includes trained modules for dialogue. A second subcomponent includes training modules for a placement test. A third subcomponent includes trained modules for emotional expressions. In this embodiment, the component 2 sub-components may be designated #2-1, #2-2, and #2-3, referring to the trained modules for dialogue, training modules for a placement test, and trained modules for emotional expression respectively.

Figure 3:
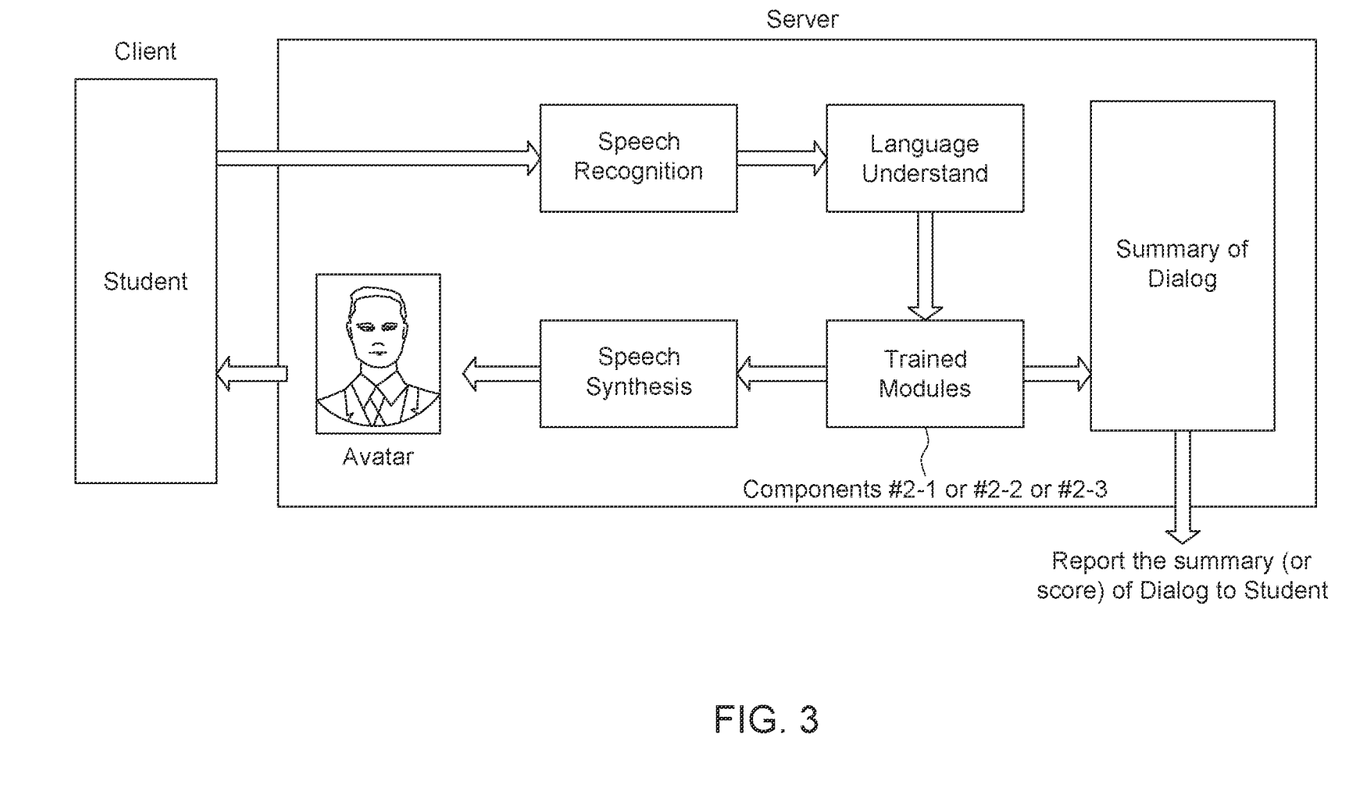
FIG. 3 shows operation of the language learning methods of the invention.

FIG. 3 shows exemplary methods of the present invention. As shown in FIG. 3, a client or student inputs speech to the computer (server) which performs a speech recognition step, the speech is then input to a language understand module which is an input into, for example, one of the component 2, subcomponent modules, e.g., training modules for dialogue, training modules for a placement test, or trained modules for emotional expressions. A summary or test result from each of the subcomponent modules can then be output to a summary of dialogue (or test score) to the student. The trained modules can be output to a speech synthesis module which is subsequently output to an avatar module which outputs to the student.

Figure 4:
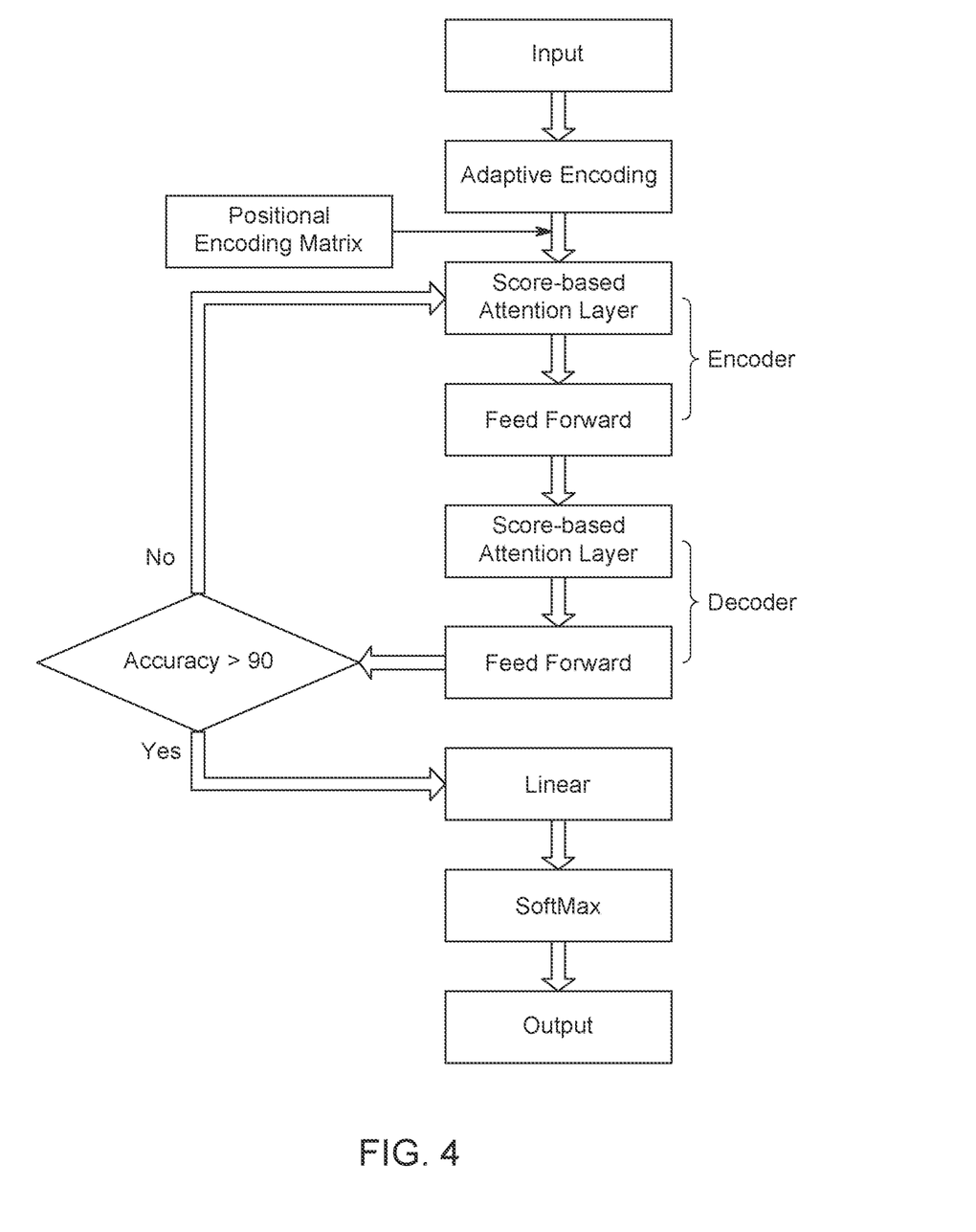
FIG. 4 shows flow charts demonstrating how modules are trained.

FIG. 4 describes how training of the modules is performed. Language is input to an adaptive encoding step, i.e., parsed into tokens and each token is converted into a vector. Then, a positional encoding matrix is output to encoder decoder blocks. The encoder includes encoding layers that process the input iteratively one layer after another, while the decoder consists of decoding layers that do the same to the encoder's output. The function of each encoder layer is to generate encodings that contain information about which parts of the inputs are relevant to each other. It passes its encodings to the next encoder layer as inputs. Each decoder layer does the opposite, taking all the encodings and using their incorporated contextual information to generate an output sequence. To achieve this, each encoder and decoder layer makes use of an attention mechanism.

For each part of the input, attention weighs the relevance of every other part and draws from them to produce the output. Each decoder layer has an additional attention mechanism that draws information from the outputs of previous decoders before the decoder layer draws information from the encodings. Both the encoder and decoder layers have a feed-forward neural network for additional processing of the outputs and contain residual connections and layer normalization steps, e.g., linearization and SoftMax used commonly in neural networks.

In the present invention, Attention(Q, K, V, S)=softmax $((QK^T S)/(\sqrt{dk} \sqrt{ds}))V$.

Where:

dk is the dimension of each Q and K ds is the dimension of each K and S

Each word is associated with a query vector q, a key vector k, and value vector v, and a score s. There are objected by multiplying the input encoding matrix that are learned during training. The encoder and decoder blocks are multiple identical encoders and decoders stacked on top of each other. Both the encoder stack and the decoder stack have the same number of units.

Figure 5:
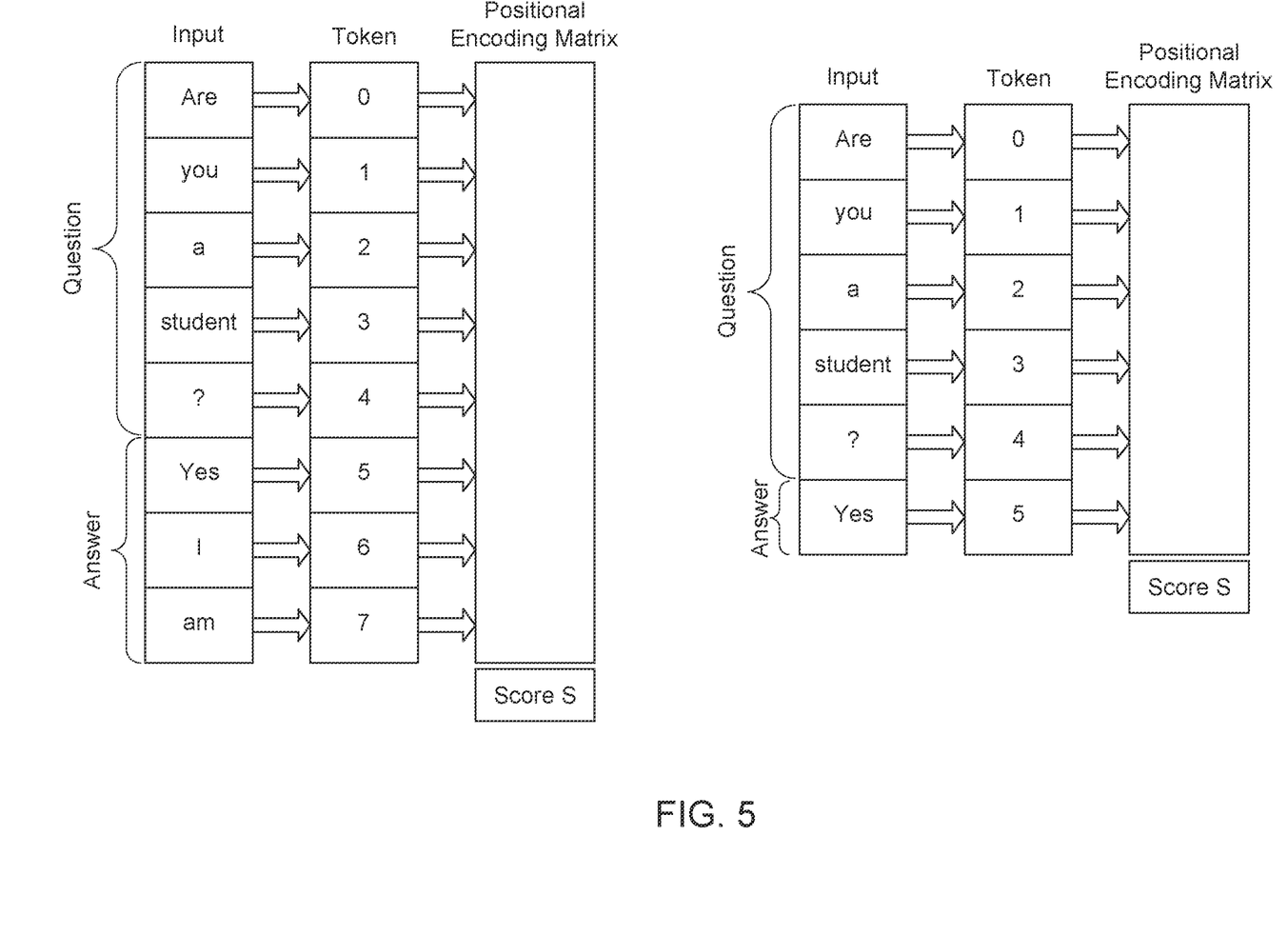
FIG. 5 shows examples of adaptive encoding using different sizes of tokens.

FIG. 5 shows examples of adaptive encoding using different sizes of tokens. The score S indicates the closeness between the questions and answers.

Glossary

Course materials as used herein generally includes books, textbooks, and other written materials typically used in an English as a second language course in an academic context. Course materials include topics such as Functional English, Pronunciation, English through American Culture, Idioms in American English, Sentence Structure, Speaking, Reading, Listening, Job Success, Academic Writing, Business Writing, and the like. Course materials can include various levels including beginner, intermediate, and advanced.

Placement tests are tests commonly used in a variety of contexts including academia, to determine what level a student is presently at in an education or instruction related context, e.g., a beginner level, an intermediate level, or an advanced level.

Speech recognition or speech recognition software provides hardware and software that enable the recognition and translation of spoken language into text by computers. Speech recognition by computers is well known and commonly used in the computer arts. See e.g., speech recognition, Wikipedia, the free encyclopedia, retrieved 8 Mar. 2023, herein incorporated by reference.

Speech synthesis is widely used in computing and is the artificial (computer) production of human speech which is generally a reverse process of speech recognition. A computer system used for this purpose is sometimes called a speech synthesizer or speech synthesizer component or module and can be implemented with software and hardware components. A text-to-speech synthesizer converts language into speech. See e.g., speech synthesis, Wikipedia, the free encyclopedia, retrieved 8 Mar. 2023, herein incorporated by reference.

An avatar is a graphical representation of a character or persona. Avatars can be two-dimensional, or alternatively, an avatar can take the form of a three-dimensional model. In the present invention, an avatar is typically in the form of a two- or three-dimensional persona or character that interacts with a student or user through a computing device. Avatars are well known in computing and are used in a variety of contexts including online chat and messaging, as online assistants, and in video gaming. See e.g., Avatar (computing), Wikipedia, the free encyclopedia, retrieved 8 Mar. 2023, herein incorporated by reference.

Trained modules for dialogue are for dialog language learning that include conversation or dialog practice and training.

Trained modules for emotional expression includes training for various pronunciations with emotional factors for students to adapt their language learning to various environments, including various business environments. Thus, this can include various pronunciations, accents, contractions, etc., that are used in different environments, particularly different business or working environments.

Attention neural networks or attention machine learning is a technique that mimics cognitive attention. Attention neural networks can be applied to language processing and transformers. For example, given a sequence of tokens $t_i$, labeled by the index i, the neural network computes a soft weight $w_i$ for each $t_i$ with the property that $w_i$ is non-negative and $\Sigma_i w_i = 1$. Each $t_i$ is assigned a value vector $v_i$ which is calculated from the word embedding of the ith token. The weighted average $\Sigma_i w_i v_i$ is output.

A transformer is a deep learning model that adopts the mechanism of attention neural networks, differentially weighting the significance of each part of input data. It is used in the fields of natural language processing. Transformers are designed to process natural language. Transformers process the entire input all at once. The attention mechanism provides context for any position in the input sequence. For example, when the input data is a natural language sentence, the transformer does not have to process one word at a time. This reduces training times.

The present invention may be implemented on a wide variety of computer component and network architectures. A computer may be a single computer or in a network of multiple computers. A computer may communicate via a central component (e.g., server, cloud server, database, etc.). In embodiments, the central component may communicate with one or more other computers. Information obtained to and from a central component may be isolated for each computer such that computer may not share information with the computer. Alternatively, the computer may communicate directly with the second computer.

The computer (e.g., user computer, enterprise computer, etc.) typically includes a bus which interconnects major components of the computer, such as a central processor, memory (typically RAM, but which may also include ROM, flash RAM, or the like), an input/output controller, a display such as a computer display or touch screen, a user input interface, which may include one or more controllers and associated user input or devices such as a keyboard, mouse, WiFi/cellular, touchscreen, microphone/speakers and the like, and may be coupled to the I/O controller, fixed storage, such as a hard drive, flash storage, fibre channel, SAN device, SCSI device, and the like, and a removable media components operative to control and receive an optical disk, flash drive, and the like.

The bus enables data communication between a central processor memory, which may include read-only memory (ROM), flash memory, or random-access memory (RAM). The RAM can include the main memory into which the operating system and application programs are loaded. The ROM or flash memory can contain Basic Input-Output system (BIOS) which controls basic hardware operation such as interactions with peripheral components. Applications resident with the computer can be stored on and accessed via a computer readable medium, such as a hard disk drive (e.g., fixed storage), an optical drive, or other storage medium.

The fixed storage may be integral with the computer or may be separate and accessed through other interfaces. A network interface may provide a direct connection to a remote server via a telephone link, to the Internet via an internet service provider (ISP), or a direct connection to a remote server via a direct network link to the Internet via a POP (point of presence) or other technique. The network interface may provide such connections using wireless techniques, including digital cellular telephone connection, Cellular Digital Packet Data (CDPD) connection, digital satellite data connection or the like. For example, the network interface may enable the computer to communicate with other computers via one or more local, wide-area, or other networks.

Other devices or components may be connected (e.g., document scanners, digital cameras and so on). The components can be interconnected in various ways. The operation of a computer is readily known in the art. Code to implement the present methods can be stored in computer-readable storage media such as one or more of the memory, fixed storage, removable media, or on a remote storage location.

The term "vocational" as used herein generally refers to relating to, or training, in a specific skill or trade usually with a view to gainful employment soon after completion of the course.

While this disclosure includes specific examples, it will be apparent after an understanding of the disclosure of this application has been attained that various changes in form and details may be made in these examples without departing from the spirit and scope of the claims and their equivalents.

The invention claimed is:

1. A computer implemented method for vocational language learning comprising:
    delivering a person's speech into a computer using speech recognition software including a Transformer attention neural network with encoding only and sending the output of the speech recognition software to a language adaptive encoding module which outputs a positional encoding matrix;
    inputting the positional encoding matrix to a trained Transformer attention neural network module comprising both an encoder and decoder block, and a feed forward neural network layer; wherein the trained Transformer attention neural network module is trained using course materials for language learning and the trained Transformer attention neural network module comprises trained modules for dialogue, trained modules for a placement test, and trained modules for emotional expression;
    receiving the output of the trained attention neural network module into a speech synthesis module;
    delivering the output of the speech synthesis module to an avatar on the computer; and
    delivering speech from the avatar to the person.

2. The computer implemented method for language learning of claim 1, wherein each trained module comprises a beginner level, an intermediate level, and an advanced level.

3. The computer implemented method for language learning of claim 1, wherein each trained module outputs a test score.

4. The computer implemented method for language learning of claim 1, wherein the trained attention neural network module outputs a test score.

5. The computer implemented method for language learning of claim 1, wherein the trained attention neural network module comprises two encoder blocks and two decoder blocks.

6. The computer implemented method for language learning of claim 5, wherein the encoder and decoder blocks are identical encoders and decoders stacked on top of each other.

7. The computer implemented method for language learning of claim 6, wherein an encoder stack and a decoder stack comprise the same number of units.

8. The computer implemented method for language learning of claim 1, wherein the language is English.

9. The computer implemented method for language learning of claim 1, wherein the avatar delivers lectures with pre-defined scripts.

10. A computer implemented method for vocational language learning comprising: delivering a person's speech into a computer using speech recognition software including a BERT Transformer attention neural network and sending the output of the speech recognition software to a language adaptive encoding module which outputs a positional encoding matrix;

inputting the positional encoding matrix to a trained GPT Transformer attention neural network module comprising an encoder and decoder block and a feed forward neural network layer; wherein the trained Transformer attention neural network module is trained using course materials for language learning and the trained Transformer attention neural network module comprises trained modules for dialogue, trained modules for a placement test, and trained modules for emotional expression;

receiving the output of the trained attention neural network module into a speech synthesis module;

delivering the output of the speech synthesis module to an avatar on the computer; and delivering speech from the avatar to the person.

* * * * *